July 28, 1936.  F. L. O. WADSWORTH  2,048,983
GLASS FEEDER
Filed July 11, 1933  3 Sheets-Sheet 1
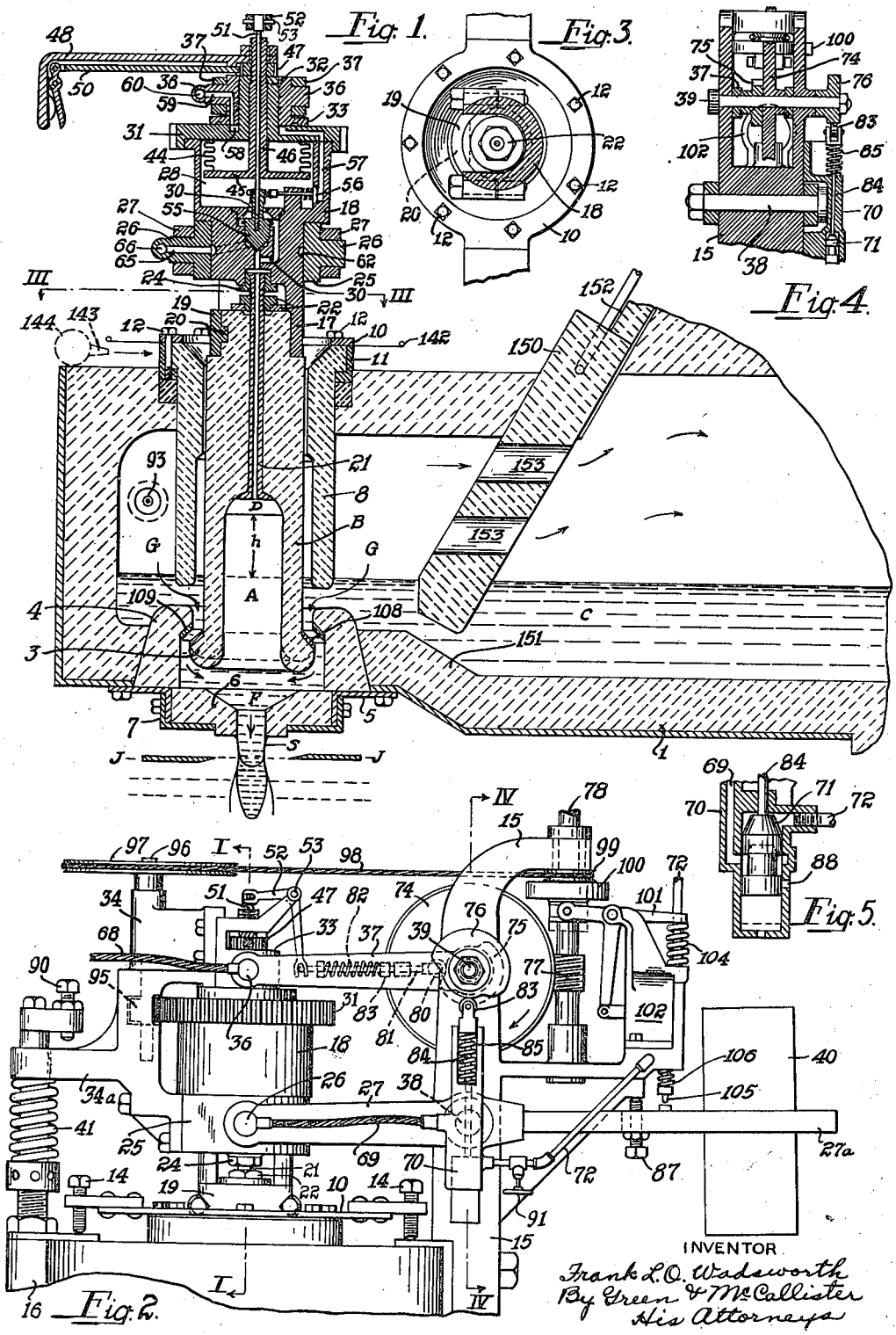
INVENTOR
Frank L. O. Wadsworth
By Green & McCallister
His Attorneys

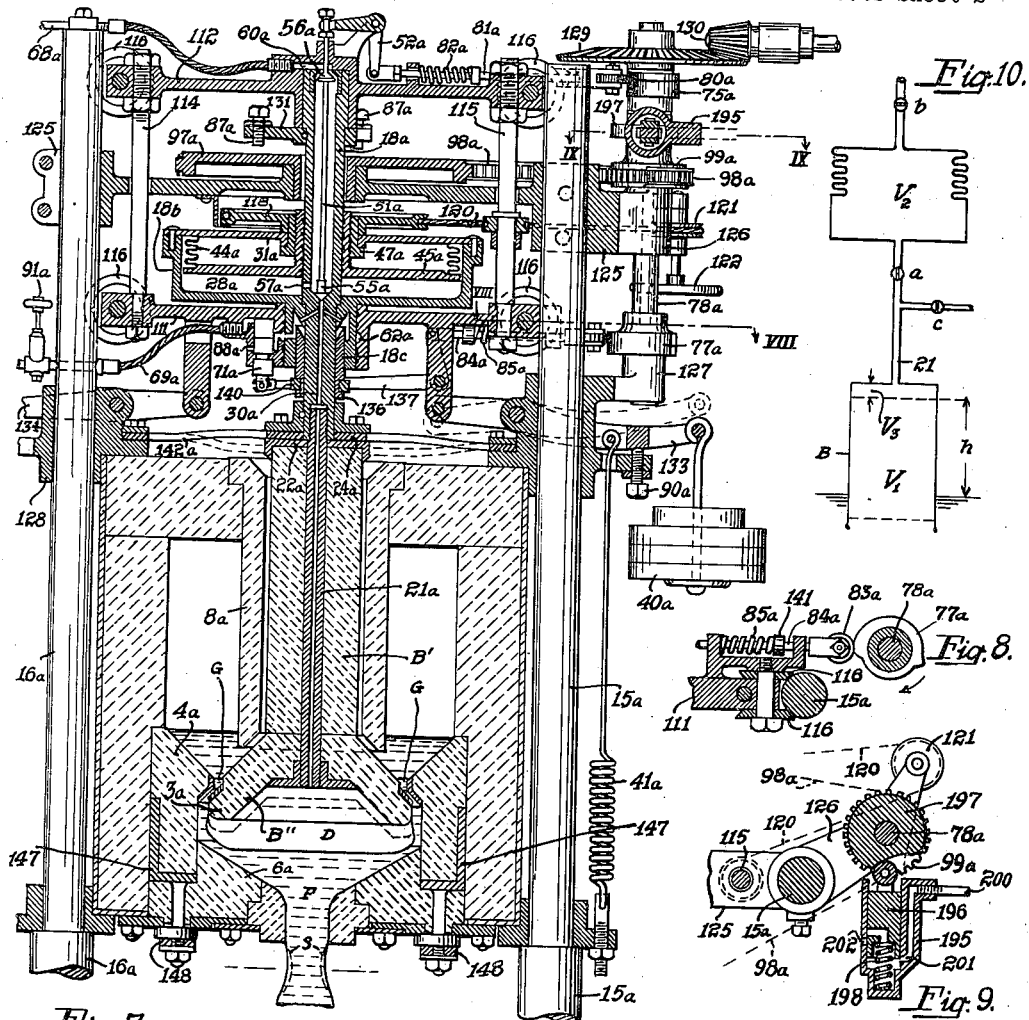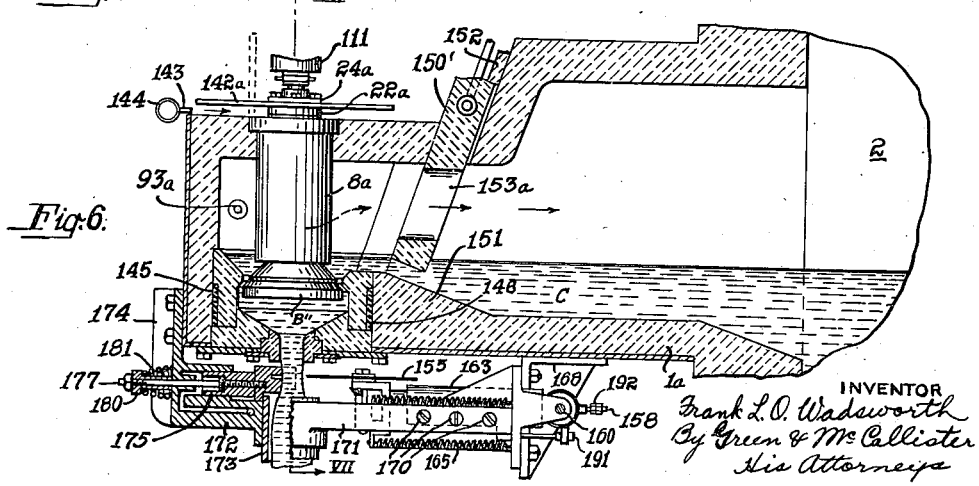

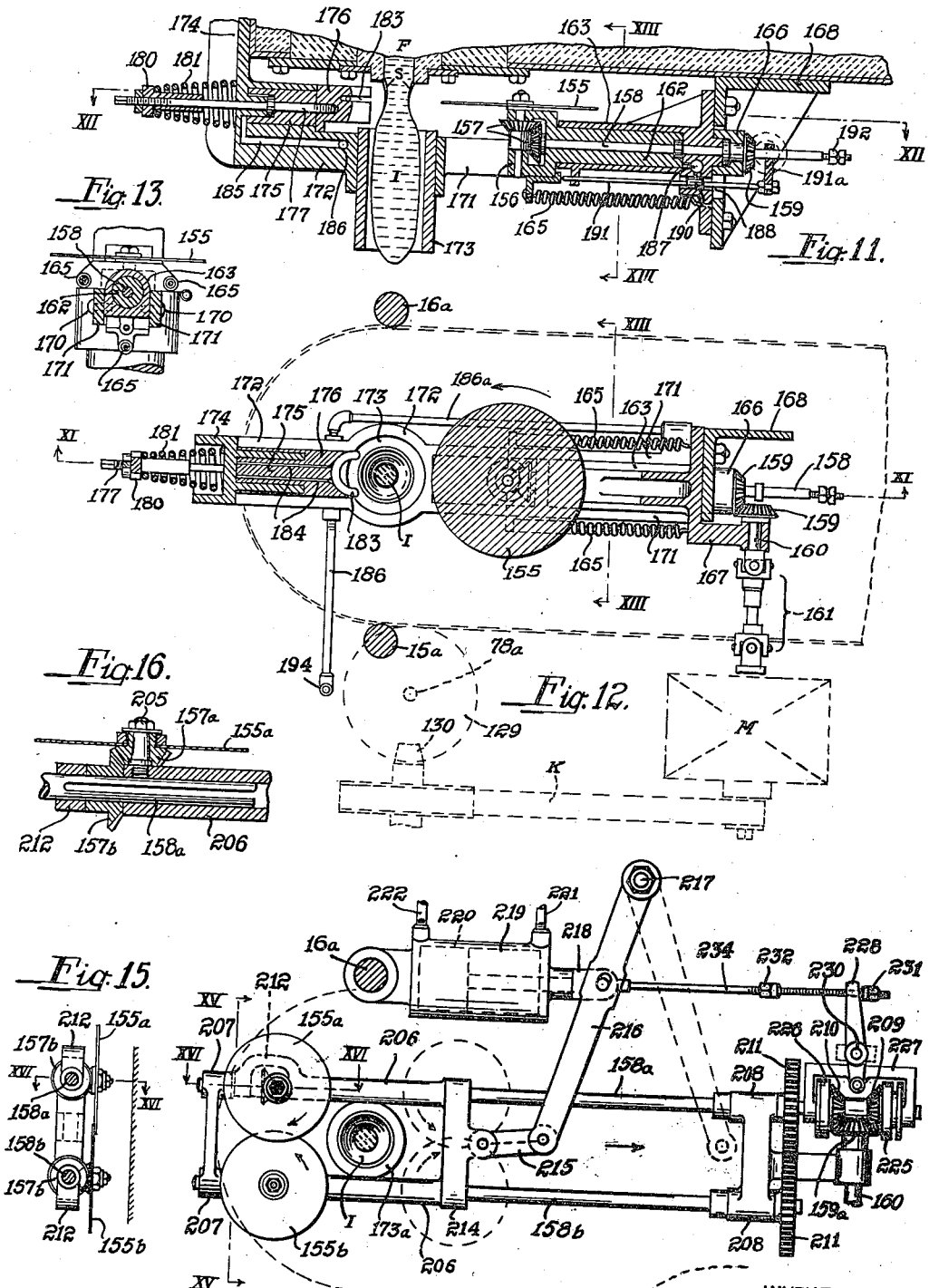

Patented July 28, 1936

2,048,983

UNITED STATES PATENT OFFICE 2,048,983

GLASS FEEDER

Frank L. O. Wadsworth, Pittsburgh, Pa., assignor to Ball Brothers Company, Muncie, Ind., a corporation of Indiana Application July 11, 1933, Serial No. 679,888

20 Claims. (Cl. 49—55)

My invention relates to glass feeders of the forced-flow-pneumatic impulse type, in which a sub-atmospheric or "vacuum" pressure is used to draw or suck successive quantities of the molten material from a pool or parent body into a segregation chamber or "bell", and a super-atmospheric pressure is applied to the said segregated charges to accelerate the discharge or extrusion of the glass from a delivery or "flow" orifice that is in constantly open communication with the said chamber.

One of the principal objects of this invention is to provide a method and a means, whereby the application of the vacuum or sub-atmospheric pressure to the glass automatically, and in itself, decreases the resistance to the flow of the molten material from the parent pool to the interior of the segregation chamber, and thus permits a free and unrestricted accumulation of the glass therein; and whereby the application of the increased super-atmospheric pressure also automatically increases the resistance of return flow, from the chamber to the pool, and thus enables the higher pressure to act most rapidly and effectively in augmenting the discharge of the segregated material from the delivery or feed orifice.

Another important object of my invention is to provide an improved mode of procedure in applying the vacuum or suction force to the glass in the delivery bell, by which it is possible to utilize a very low sub-atmospheric pressure, or "high vaccum" at the initiation of the flow of the glass to the segregation chamber, and thus accelerate the accumulation of the charge therein; and then automatically and progressively decrease this force—without the aid of any mechanically actuated valves or other instrumentalities—as the accumulation proceeds, thereby eliminating any danger or possibility of an overcharging of the said chamber and of a clogging or blocking of the air passage leading thereto.

Still another purpose of these improvements is the provision of means for readily varying and controlling the maximum quantity of glass that can be drawn into the segregation chamber, at each application of the sub-atmospheric or vacuum pressure, and thereby maintaining a substantially constant mean or average level of the glass therein during successive cycles of action.

A further purpose of this invention is to provide a novel form of severing mechanism for cutting the glass stream close to the delivery orifice without chilling or marking the molten material at the plane of severance.

Other auxiliary and supplemental features of my present improvements are directed to the maintenance of uniform temperature conditions in the glass as it is drawn from the parent body and discharged from the delivery orifice; to the prevention of the escape of the heating gases from the receptacle which contains the molten material; and to the provision of means by which various parts of the apparatus may be readily adjusted, or removed and replaced with a minimum loss of time etc. These and other additional objects of my invention will become apparent to those skilled in this art, by the following description of certain exemplary embodiments thereof, which are illustrated in the accompanying drawings, and in which:

Figure 1 is a longitudinal central section through the forehearth of a glass furnace—on the plane I—I of Fig. 2—that is provided with one form of my improved feeder;

Fig. 2 is a front elevation of this structure;

Fig. 3 is a partial cross section on the plane III—III of Fig. 1;

Fig. 4 is another partial section on the plane IV—IV of Fig. 2;

Fig. 5 is an enlarged vertical cross section of one of the valve members which is shown in elevation in this same figure;

Fig. 6 is a composite longitudinal section and elevation of a part of a second illustrative exemplification of the present invention;

Fig. 7 is an enlarged cross section, and partial front elevation, on the plane VII—VII of Fig. 6;

Figs. 8 and 9 are partial cross sections on the respective planes VIII—VIII and IX—IX of Fig. 7;

Fig. 10 is a semi-diagrammatic illustration of the principle of automatically varying vacuum cont.ol which constitutes one feature of the operation of these several forms of improved feeder construction;

Fig. 11 is a longitudinal section, on a somewhat enlarged scale, of one form of my improved shear mechanism, a part of which is shown in elevation in Fig. 6;

Fig. 12 is a horizontal section of this mechanism on the plane XII—XII of Fig. 11;

Fig. 13 is a cross section on the plane XIII—XIII of this same figure;

Fig. 14 is a partial plan view of another embodiment of this feature of my invention;

Fig. 15 is a partial end view of this second form of improved shear mechanism (on the plane XV—XV of Fig. 14); and Fig. 16 is an enlarged vertical section on the plane XVI—XVI of Figs. 14 and 15.

The structure which is shown in Figs. 1 to 5, inclusive, comprises a forehearth or feed "boot" 1 which is connected to the "fining" chamber of a glass tank furnace; and which is provided near its front end with a submerged delivery orifice F, and with an inverted cup or bell B that is positioned above—and preferably in vertical alignment with—this orifice. The lower end of the bell B is enlarged to form an annular beveled head 3, which is positioned within and just below a cooperating inwardly tapered sleeve member 4 that is removably supported on the floor of the forehearth frame by the flanged collar 5. The lower end of this sleeve 4 is closed by the detachable flow bushing 6, which contains the delivery orifice F, and which is also supported in the collar 5 by the flanged cap 7. The bell member B is surrounded by a guard sleeve 8 whose lower end is immersed in the parent body of glass in the forehearth, and whose upper end projects through, and is closely engaged by, an opening in the roof of the forehearth chamber. The upper flanged head of this sleeve is clamped against a flat plate 10, by means of the flanged collar 11 and the bolts 12—12 etc.; and the assembly 8—10—11—12 etc. is adjustably supported, as a whole, by the cap screws 14—14 which are threaded through radial extensions of the plate 10, and are engaged by inwardly projecting lugs on the side posts 15, 16 of the forehearth frame. The outer periphery of the clamping collar 11 is also closely engaged by the upper enlarged portion of the forehearth roof opening, and the annular space below the lower end of this collar and the adjacent face of the sleeve 8, may, if desired, be loosely filled with asbestos wool, so as to more completely seal the sliding joint between the said sleeve and the forehearth cap, and thus substantially eliminate any outflow of heated gases through this joint.

The upper end of the bell B is reduced in diameter to fit into a semi-cylindrical extension 17, of a shaft 18; and is clamped against this extension by the cap 19, which is provided with an internal rib 20 that engages with a transverse slot in the adjacent side of the bell member B. This member is also centrally cored to receive a tubular bolt 21, which is preferably made of nichrome or some similar high resistivity alloy, and which is clamped in position in the bell by the nut and washer elements 22. The upper end of the tube 21 is also engaged by a flanged and threaded collar 24, which is adapted to enter a central recess in the lower end of the shaft 18, and which can be forced tightly against the end surface of the said shaft, by turning it on the tubular bolt 21, so as to form a fluid tight joint therewith.

The shaft member 18 is rotatably mounted in a block 25 which is provided with radially extending trunnions 26—26, that are pivotally engaged with the inner ends of a pair of radius guide arms 27—27; and its upper end is bored out to form a chamber 28, which is connected to the segregation chamber D, in the interior of the bell B, by a "two way" valve controlled passage 30—30, that extends through the shaft 18 and communicates, at its lower end, with the central duct of the tubular bolt 21. The upper end of the chamber 28 is closed by a flanged head 31 which is provided with a central upwardly extended shaft element 32 that is rotatably mounted, in coaxial relationship with the shaft element 18, in a flanged bearing block 33; and in order to assist in the establishment and maintenance of an accurate alignment of the two shaft elements 18 and 32 the lower and upper bearing blocks 25 and 33 are detachably connected by a U-shaped bracket 34 (see Fig. 2).

The upper shaft bearing member 33 is, like the lower block 25, provided with radially extending trunnions 36—36, which are pivotally engaged by the inner ends of a second pair of radius guide arms 37—37. The two pair of guide arms 27—27 and 37—37, are respectively supported, at their outer ends, on cross bolts 38 and 39 that are carried by the side post 15; and together form a "parallel link" system which performs the joint functions of preventing rotation of the bearing block members (25 and 33), and of permitting the entire interconnected assembly of bell, shaft and bearing elements (B—18—25—32—33—34) to move freely up and down in a path substantially coincident with the axis of shaft rotation. In order to facilitate this free up and down movement the lower guide arms 27—27 are provided with extensions 27ª, which carry an adjustable counterweight 40; and the bracket 34 is also preferably provided with an extension 34ª, whose outer end is supported by an adjustable spring 41 that is carried by the side port 16 of the forehearth frame. By adjusting the position of the counterweight 40, and the tension of the spring 41, the weight of the suspended parts may be accurately balanced, so that a very small force will be sufficient to move them up or down.

The flanged head 31—which forms the upper closure for the shaft chamber 28—is provided with a downwardly extending "sylphon" bellows 44, which is of slightly less diameter than the interior of the said chamber, and which is attached, at its lower end, to a piston 45; and this piston element is, in turn, secured to a hollow piston rod or stem 46 that extends upwardly through the upper shaft member 32. The stem 46 is threaded at its upper end to engage a rotatable nut 47, which is confined—against axial movement—in a transversely slotted portion of the upper bearing block 33; so that, by turning this nut, the piston element 45 may be moved up and down, in the chamber 28, to vary the volume of the latter. The nut 47 may be conveniently rotated by means of the ratchet lever 48, which is pivotally mounted on the piston stem 46, and which is provided with a spring retracted dog 50, that may be manually engaged, when desired, with the toothed periphery of the nut.

The piston rod 46 is centrally bored to receive an axially movable valve rod 51, which is connected, at its upper end, to one arm of a bell crank lever 52, that is pivotally mounted at 53, on an extension of the upper bearing block 33; and which is attached, at its lower extremity, to a double ended "plug" valve 55 that is adapted, when raised, to close the upper end of the passage 30 and thus shut off communication between the chambers 28 and D. The head of this valve is provided with a wedge shaped portion which engages with a cross pin in the slotted end of a second valve stem that is attached to the disc valve 56; and when the valve member 55 is lifted (to close the passage 30) the valve 56 will be concurrently moved away from its seat (against the tension of the spring which tends to hold it seated) and the branch passageway 57 from the chamber 28 will be opened. This branch passageway leads—as shown—to an annular groove 58, in the upper face of the head 31, which is covered by the lower flanged end of the bearing block 33; and this block is, in turn, provided with a passageway 59 that is in registry, at its inner end, with the groove 58, and is connected, at its outer end, with a transverse opening 60 in the end of the trunnion 36.

The lower tapered end of the valve 55 is engaged—when in its lower position—with a coned seat in the shaft member 18; and, when so seated, it serves to cut off communication between the lower ends of the passageway 30 and the radial ducts (one of which is shown in dotted lines in Fig. 1), which lead outwardly from the grooved seat for the valve 55 to an annular or circumferential groove 62 on the periphery of the said shaft. The groove 62 is in registry with a radial passageway 65 which is formed in the connected bearing block and trunnion elements 25—26, and which communicates with the transverse opening 66 in the outer end of the said trunnion member; and when the valve 55 is lifted—to close the upper end of the passageway 30—free communication is established between the lower end of the passage 30 and the trunnion duct 66.

The passageway 60 in the trunnion 36 is flexibly connected, by the spirally wound "armored" hose pipe 68, to a suitable source of high vacuum, (e. g. to a high speed rotary vacuum pump), which is of sufficient capacity to quickly reduce the pressure in the chamber 28 to one-thirtieth or one-fiftieth of an atmosphere, and to compensate for any small leaks in the vacuum pipe connections, when the valve 55 is lifted to its upper seat and the valve 56 is opened. The passageway 66, in the trunnion 26, is also flexibly connected (by the "armored" hose 69 or in any other suitable manner) to a valve box 70, which is mounted on the side of the post 15, in front of the adjacent radius guide arm 27, and which contains a reciprocable piston valve 71 (see Figs. 4 and 5) that controls the passage of fluid from the compressed air conduit 72 to the flexible pipe connection 69.

The valves 55 and 71 are respectively actuated, in the desired time relationship (see infra), by a pair of cams 75 and 76, which are secured on the cross shaft 39 that also serves as the outer pintle mounting for the radius guide arms 37—37. As already stated this cross shaft is supported in the side post 15—that is slotted or forked in the upper portion to receive the outer ends of the guide arms (37—37)—and is revolved at a constant speed by means of a worm wheel 74, which is mounted between the said arms, and is engaged by a worm 77 on a vertical shaft 78, that is also rotatably supported on the side post 15, and is actuated by any suitable motor connection. The cam 75 is positioned between the arms 37—37, at one side of the worm wheel 74, and is engaged by a cam roller 80, which is carried by a reciprocable rod 81, that is coupled, by a pin and slot connection, to the longer arms of the bell crank lever 52, and which is held against the cam 75 by a spring 82, that is interposed between the inner slide bearing for the rod 81 and an adjustable collar 83 secured thereon. The cam 76 is mounted on the shaft 39, at a point outside of the post 15, and is engaged by a cam roller 83a, which is carried by the vertically reciprocable valve rod 84, and is held in engagement with the said cam by the spring 85.

The operation of the parts thus far described is as follows: When the valve mechanism is in the position shown in full lines in Figs. 1 to 5, inclusive, the vacuum pump connection to the chamber 28 is closed (by the seating of the valve 56); the connection between this chamber and the space above the glass in the air bell segregation chamber D is open; and the connections leading from this space to the compressed air conduit 72 are doubly closed, first by the valve 55, and second by the valve 71. Under these conditions the vacuum earlier established in the chamber 28 is acting to hold the bell assembly in its lowermost position—which is determined by the engagement of the adjustable "stop" screw 87 on the arms 28a, with an adjacent portion of the fixed side post member 15—and to thus open the passageway G, between the parent body of glass (C) and the segregation chamber (D); and is also concurrently acting to suck or draw the glass through this wide open passageway (G) into the interior of the lowered bell; this last action being limited and automatically controlled (as will be presently explained) by the relative volumes of the connected, but externally sealed, chambers 28 and D. When a sufficient quantity of glass has thus been segregated or accumulated in the bell chamber—as indicated by the raised level of glass therein—the cam 75 acts to rock the lever 52 and lift the valve stem 51 thereby closing the upper port in the passageway 30 and opening the lower port between the said passageway and the pipe connections 65—66—69. The cam 76 then comes into action to depress the valve rod 84 and the piston valve 71 thereby first opening a connection to an atmospheric vent port 88, and then establishing communication between the pipe 69 and the compressed air conduit 72. The resultant admission of compressed fluid to the space D acts to raise the bell assembly until its upward movement is arrested by the engagement of the adjustable "stop" screw 90 with the arm 34a, and thus "throttle" the supply passageway G; and concurrently acts to accelerate the discharge of glass from the delivery orifice F, and thus swell or "stuff" the outflowing stream to the desired diameter of a mold charge. When the proper quantity of material has thus been extruded the cam 76 permits the spring 85 to lift the valve 71 thus closing the port opening between the conduit 72 and the pipe connection 69, and then momentarily opening and immediately thereafter closing the atmospheric vent port 88, thus reducing the pressure in the chamber D to that of the outside air. The cam 75 then permits the spring 82 to rock the lever 52 in a counter-clockwise direction, thereby opening the upper port in the passageway 30, and simultaneously permitting the closure of the poppet valve 56. During the interim of pressure application the chamber 28 has been evacuated by the action of the vacuum pump, and the opening of communication between it and the chamber D, will immediately create a partial vacuum therein, which will act, as before, in depressing—or more properly stated, in drawing down—the bell-shaft assembly and reopening the supply passage G; and will concurrently act in drawing a fresh charge of glass into the interior of the depressed bell.

The control of the degree of the initial vacuum in the segregation chamber, and the automatic limitation on its action, during this phase of the operation can be most readily understood by reference to the diagrammatic illustration of Fig. 10. Let $V_1$ and $P_1$ indicate respectively the volume and the pressure of the air in the bell or segregation chamber (D) at the instant when the valve (a) between it and the control chamber (28) is opened; and let $V_2$ and $P_2$ correspondingly represent the volume and the pressure of the air in the said control chamber at this time. The opening of the communication between these chambers (D and 28) will produce a new equalization pressure P' in the connected spaces; and if there is no substantial change in temperature during such equalization (and if the volume of the connecting passageways is small as compared with $V_1$ and $V_2$ this equalized pressure P' will be $$P' = \frac{P_1 V_1 + P_2 V_2}{V_1 + V_2} \quad (1)$$

As the glass rises in the bell chamber (B) the volume of the air space therein will be progressively reduced, and the pressure in the connected chamber will be correspondingly increased. When the glass has risen to a height $h$, (above the glass in the pool) and the residual volume of the air in chamber D is reduced to $V_3$, the increased pressure P" (still assuming no substantial change in temperature) will be $$P'' = P' \frac{(V_1 + V_2)}{V_2 + V_3} = \frac{P_1 V_1 + P_2 V_2}{V_2 + V_3} \quad (2)$$

Now let us assume that at the height $h$ there has been established a condition of hydrodynamic equilibrium. Then the pressure P" must be equal to $$P_0 - \Delta h$$

where $P_0$ is the pressure on the glass surrounding the bell (which may be assumed to be that of the outside air although it is generally a little higher than this); $h$ is the height in inches above the pool level and $\Delta$ is the weight per cubic inch of the molten glass. For the purposes of this illustration we may take $P_0$ as 14.7 (lb. per sq. inch) and $\Delta$ as 0.1; and we therefore have $$\frac{P_1 V_1 + P_2 V_2}{V_2 + V_3} = 14.7 - 0.1h$$

or $$V_2 = \frac{P_1 V_1 - (14.7 - 0.1h) V_3}{14.7 - 0.1h - P_2} \quad (3)$$

If $V_3$ equals 0.1 $V_1$ (which represents a maximum change of level of the glass corresponding approximately to that shown in Figs. 1 and 10); and if the pressure in the segregation chamber (D) is equalized with that of the outside air just before the valve $a$ is opened, (as in the above described operation of the construction shown in Figs. 1 to 5 inclusive), then the above relationship becomes $$V_2 = \frac{V_1(13.23 + 0.01h)}{14.7 - 0.1h - P_2} \quad (4)$$

$P_2$ is preferably very small; and if it is one-fiftieth of an atmosphere (see supra) we have the relation $$V_2 = \frac{V_1(13.23 + 0.01h)}{14.4 - 0.1h}$$

or $$14.4 - 0.1h = \frac{V_1}{V_2}(13.23 + .01h) \quad (5)$$

From which we can readily determine the relation between volume $V_2$ of the control chamber 28, (or the ratio between its volume and the volume $V_1$ of the segregation chamber at the end of the pressure action and the beginning of the vacuum action), and the maximum rise of glass in the bell chamber (D).

A few examples of the effect of varying the ratio $$\frac{V_1}{V_2}$$

are illuminating. If $$\frac{V_1}{V_2}$$

is unity then $h$ is a little more than ten and one-half inches which is more than is usually required or desirable. If, on the other hand, $h$ is 2¼ inches—as illustrated in Fig. 1—then $$\frac{V_1}{V_2}$$

is approximately 1.07; or the volume of the control chamber 28 should be approximately 6½% less than that of the segregation chamber at the beginning of the suction action.

It will be readily understood that the principle of vacuum control just described does not depend upon the opening of the segregation chamber to the outside air before it is put into communication with the control chamber 28. If the pressure $P_1$ is the same as that at the end of the pneumatic extrusion action—and if for illustration we assume this to be approximately two lbs. gauge pressure—then we have from (1) supra ($V_3$ being limited as before to 0.1 $V_1$).

$$V_2 = \frac{15.23 + 0.01h}{14.4 - 0.1h}$$

or $$14.4 - 0.1h = \frac{V_1}{V_2}(15.23 + 0.01h) \quad (6)$$

and if $h$, as before, is 2¼", $\frac{V_1}{V_2}$ is approximately 0.93; or the volume of the control chamber (28) should in this case be about 7½% greater than that of the bell chamber (D) at the time it is put into communication therewith.

Under any condition of operation that may be assumed—i. e. for any values of $V_1$ $P_1$ $P_2$ and $V_3$— and regardless of the level to which the glass is depressed during the expulsion stage of the pressure-vacuum cycle, it is possible to control the initial vacuum to which the glass is exposed, and the maximum amount of glass which can be drawn into the bell during the application of the vacuum (i. e. during the time the bell is connected to the vacuum control chamber 28), by varying the volume $V_2$ of the control chamber 28; and this is readily accomplished, during the operation of the feeder, by raising or lowering the "packless" piston head 45 by means of the nut and screw adjustment above described; while the amount of glass discharged during the pressure application is readily controlled by a regulating valve, such as that shown at 91, in the pressure supply conduit 72. The rate of expulsion of the molten material—under the combined effect of gravity and of any predetermined or preadjusted pneumatic pressure—is also readily varied by adjusting the stop screw 90, which will determine the degree to which the passage G is "throttled" or restricted, and therefore the amount of return flow from the segregation chamber to the parent body of glass, during the pressure application stage.

The utilization of the above described vacuum chamber control principle has a further great advantage in permitting initial application of a much higher degree of vacuum than is permissible in the operation of the usual type of "air feeder"— e. g. such as is shown in the Hitchcock or Mc- Cauley Patent Nos. 865,068 or 1,322,318—because the automatic and progressive decrease in the vacuum as the glass rises in the bell, eliminates any possibility of sucking the rising material into the air pipe and thus clogging the system. The degree of initial vacuum obtainable under any given adjustment of the volume ratio $$\frac{V_1}{V_2}$$

is readily computed from Equation (1) supra. For the case $$\frac{V_1}{V_2}=1.07$$

(where $P_1=P_0=14.7$ and $P_2=.02$ $P_0$) $P'-7.74$ which represents a vacuum of approximately 7 lbs. or nearly one-half an atmosphere. If $$\frac{V_1}{V_2}=0.5$$

(second case) $P'=8.2$ lbs., which corresponds to a vacuum of about 6.5 lbs. or 0.44 of an atmosphere. The somewhat higher initial vacuum which is obtainable when the segregation chamber is opened to the atmosphere before it is put into communication with the vacuum control chamber, is the main advantage that results from the first described mode of procedure.

The combination of a high initial vacuum and of the automatic accompanying opening of the supply passage G, results in a very much more rapid recharging, or refilling of the bell chamber, than can be secured under the usual and necessary limitations that are imposed in the operation of the Hitchcock-McCauley type of feeder—where the opening from the bell chamber to the outside body of glass is constant in area and must be so restricted as to prohibit too large a backflow therethrough when pressure is applied to the glass in the bell—and this substantial increase in the speed of segregating each successively accumulated and discharged mass of glass correspondingly increases the rate of delivery of the molten material, both because of the shorter interval of retardation, and possible retraction, of outflow during the vacuum application, and also because of the increased ratio between the interval of pressure application and the necessary interval of vacuum action. In practice the large area of the supply passage G, which is afforded by the rapid downward movement of the bell under the application of the high initial vacuum—and which is several times the area of the delivery orifice F—permits such a free flow to the chamber above the said orifice that the gravity flow therefrom will continue while the segregation chamber is being refilled; and in consequence of this there will be little, if any, retraction of the glass above the plane of severance, when the outflowing stream is cut (see infra).

The increase in the speed of the feeding operations—resulting from my improved mode of procedure—necessitates a correspondingly accelerated forward movement of the main body of glass in the forehearth chamber (C); and this in turn tends to maintain uniform temperature conditions in the parent body of molten material, as well as in the continuously renewed supply of glass above the delivery orifice. But in order to assist in this maintenance of thermal and physical homogeneity in the outflowing stream I have not only provided the usual auxiliary burners (one of which is indicated at 93 in Fig. 1) at the front end of the forehearth chamber; but I have also provided means for rotating the bell (b) when it is in its lowered position (Fig. 1). In the construction shown in Figs. 1 to 5 inclusive, this rotation is effected in the following manner: The periphery of the chamber head 31—which is rigidly secured to the shaft member 18—is provided with gear teeth which mesh with a shrouded pinion 95 that is keyed to a vertical shaft 96. This shaft is rotatably mounted in the bracket member 34, and is provided, at its upper end, with a grooved sheave 97 which is connected, by the wire rope belt 98, with a small pulley 99, that is revolvably supported on the shaft 78, and may be coupled thereto by a clutch member 100. This clutch is operated by a T lever 101, which is rocked in a counter-clockwise direction (to engage the pulley with the revolving shaft), by means of a piston member in the cylinder 102; and is rocked in the opposite direction (to declutch the pulley) by the return spring 104. When the bell-shaft-assembly is moved down, by the vacuum action on the bell (b), the upwardly moving extension 27a of the guide arms 27 engages the valve stem 105; opens a valve which admits compressed air, from the conduit 72, to the rear end of the cylinder 102; and thus engages the clutch mechanism 100. The bell will then be rotated until its next upward movement disengages the parts 27a and 105 and allows the valve stem 105 to be returned by the spring 106; thereby cutting off the admission of compressed fluid to the cylinder 102 and opening the latter to the outside air, and thus permitting the clutch to be disengaged by the spring 104.

The purpose of stopping the rotation of the bell, B, when it is in its raised position is to avoid any injury or abrasion of the adjacent inclined surfaces of the parts 4 and B—which form the "throttling valve" elements of the passageway G—and thereby maintain and prolong the desired uniform and preadjusted action of these parts during the intervals of vacuum application. In order to further protect these "valves" surfaces the "stop" screw 87 should be so adjusted as to prevent actual contact between them in the raised position of the bell; and they may be further strengthened, if desired, by facing them with thin rings 108 and 109, of "nichrome", or some other metal of high heat resistivity, which is preferably "glazed" with a coat of "vitreosil" (fused silica); or such a coating of hard and highly refractory material may be applied directly to the said surfaces.

Figs. 6, 7, 8 and 9 show another illustrative or exemplary embodiment of my present improvements which differs from that already described in the specific form and arrangement of the bell B, and of the segregation chamber D, and in some other details of construction which will be briefly considered; but which is characterized, in general, by the same broad features of structural organization and of functional performance, as are presented by the first described exemplification of my invention.

The bell of this second illustrative construction is made in two parts—an upper cylindrical member B' and a lower frusto conical head B''—which are clamped together by a heavy thick walled tubular bolt 21a of "nichrome" or of some similar alloy that is not deleteriously affected by the temperature of its surroundings. The upper end of this bolt is threaded directly into the lower extremity of a tubular shaft member 18a, which engages a flanged cap plate 22a that covers the top of the bell member B'; and these parts are further locked together by a flanged collar 24a, that is keyed to the shaft 18a and is detachably bolted to the cap 22a.

The lower head B" contains the segregation chamber D—which in this case is positioned below the level of the glass in the forehearth chamber (C)—and is surrounded by an inwardly beveled annular "valve" ring 4a which cooperates with the coned outer periphery 3a of the bell head (B") to define and limit the area of the supply passage G that leads from the forehearth chamber to the segregation chamber. The cooperating faces of the parts 3a and 4a may be reinforced with annular rings of highly refractory metal and (or) coatings of fused silica in the manner already described.

The hollow shaft member 18a is rotatably mounted in two cross head members 111 and 112, which are tied together by the spacer bolts 114 and 115, and which are provided, at their outer ends, with conical guide rolls 116—116—116 etc., whose beveled edges engage the cylindrical surfaces of two posts 15a and 16a, that are bolted to, and form a part of, the supporting frame of the forehearth. The central portion of this shaft 18a carries a cylindrical member 18b which is rigidly secured thereto, and which is provided with a downwardly extended hub 18c, that is engaged with the central bearing of the lower cross head 111. The shaft cylinder 18b—which contains the vacuum control chamber 28a—is provided with a cover plate 31a that is flexibly connected to the vertically adjustable piston head 45a by the metallic bellows, or "sylphon" element 44a; and this cover member is centrally apertured to form a bearing for a rotatable nut 47a which engages the threaded periphery of a central boss on the piston element 45a, and serves, when turned, to move the said piston up or down in the chamber 28a and thereby vary the volume of the latter. The upper end of the nut 47a is keyed, or otherwise suitably secured, in the hub of a sheave wheel 118, which is connected, by the wire rope 120, with a small pulley 121, that may be rotated, when desired, by the hand wheel 122.

The two posts 15a—16a are cross connected by a head, 125—125, whose ends are clamped to the said posts, and which is provided with a central bearing sleeve that carries a large sprocket wheel 97a. This wheel is connected, by the chain 98a, with a sprocket pinion 99a that is keyed to the vertical shaft 78a, which is rotatably supported, at one end in an offset extension 126 of the cross head 125, and, at the other, in a bracket 127 secured to a subjacent portion of the side post 15a, and which is driven from any suitable motor, by the bevel gear and pinion elements 129—130. The bell supporting shaft 18a is provided with a "tripod" driving member 131, which is keyed to the shaft, and which has three adjustable flat ended screws 87a—87a etc., that are adapted to contact with the upper surface of the sprocket wheel 97a, when the bell shaft assembly is moved downward by the vacuum application; and when this contact occurs the bell will be rotated by the frictional suction pressure engagement of the screws with the revolving wheel, and will continue to so rotate until it is again lifted by the compressed air application. With an air bell B of the size indicated in Figs. 7 and 8 (about 6½" O D), and with an initial vacuum of 7 lbs. (supra), the force which acts in depressing the suspended shaft bell assembly is approximately 230 lbs.

The reverse force which acts to raise the parts, when the super-atmospheric, or positive, pressure is applied depends on the magnitude of that pressure—which is varied with the working temperature of the glass and with other mold charge requirements—but is usually not more than sixty to seventy pounds. In order to obtain the full effect of this lifting force the mass of the vertically movable assembly is preferably balanced—or somewhat overbalanced—by adjustable counterpoise weights and springs 40a and 41a, which are attached to levers 133, 134, that are fulcrumed on the side post brackets 127 and 128, and are flexibly coupled by pin and slot connections, to depending posts on the cross head assembly 111—112—114—115 etc. The limit of upward movement is determined, as before, by adjustable stop screws 90a, which engage with the counterweight levers 133 and 134; and these "stops" are preferably so set that the two coned "valve" surfaces on the members B" and 4a are not permitted to come into actual physical contact when the bell is raised;—the viscosity of the molten glass being sufficient to prevent any substantial back flow from the segregation chamber (D) to the forehearth chamber (C) when the passageway G is "throttled" to the degree indicated in Fig. 7.

The valve mechanisms which control the application of the vacuum, (negative or sub-atmospheric), and of the positive (super-atmospheric) pressures to the glass in the segregation or delivery-outlet-chamber (D—F) also differ in some respects from those first described. The upper portion of the shaft member 18a is bored out to receive a double ended poppet valve assembly, which comprises a lower valve head 55a, which is adapted to seat in a coned recess at the upper end of the passageway 30a; and upper valve head 56a which is adapted to seat in a bushing inserted at the upper end of the shaft 18a, and thereby close the opening to the vacuum pump connections 60a—68a; and a valve rod 51a, which carries the heads 55a and 56a, and which is flexibly engaged, at its upper end, by the adjacent extremity of the bell crank lever 52a. The other arm of the lever 52a is pivotally connected to a rod 81a, and is moved in one direction—to lift the valve rod—by a cam 75a which is secured to the shaft 78a and is engaged by a cam wheel 80a at the outer end of the rod 81a; and in the opposite direction—to hold the valve assembly in the position shown in Fig. 7—by a spring 82a.

The lower end of the cylinder hub 18c is bored out to form an annular recess which is connected to the passageway 30a by radial ducts that terminate in a beveled seat for a vertically movable sleeve valve element 136, and which is also connected, by a second series of radial ducts, to an annular groove 62a on the inner surface of the bearing for the said hub 18c. The sleeve valve 136 is adapted to rotate with the shaft elements 18a and 18c, and is coupled, at its lower end, to the forked arm of a bell crank lever 137, by a groove and pivoted collar connection (140). The forked arm of this lever is also coupled, by a pin and slot connection, to the head of a piston valve 71a, which controls communication between the annular groove 62a and the compressed air conduit 69a; and which is also adapted to establish, at an intermediate point in its stroke, a momentary connection between the said groove and an atmospheric vent port 88a. The shorter side arm of the bell crank member (137) is pivotally attached to a rod 84a, which carries a cam roller 83a that is engaged by a cam 77a on the shaft 78a, and which is pressed outwardly by a spring 85a that is interposed between a guide boss on the lower cross head 111 and a collar 141 on the said rod.

The operation of the various elements of the last described control mechanisms (Figs. 6, 7 and 8) is essentially the same as that of the corresponding organization shown in Figs. 1, 2, 3, 4, and 5. Figs. 6, 7 and 8 illustrate the position of the parts at the end, or just prior to the termination, of the positive pressure application. As the shaft 78a continues to revolve (in the direction of the arrow shown in Fig. 8) the cam wheel 83a runs off the elevated portion of the cam 77a, and the spring 85a rocks the lever 137 in a clockwise direction, thus closing the compressed air port connection with the groove 62a and the passageway 30a; then momentarily opening (if desired) the connection between this passage and the outside air; and finally sealing off both of these connections by the continued movement of the plunger valve 71a, and by the seating of the beveled end sleeve valve 136. The valve assembly 51a, 55a, 56a is then lifted by the action of the cam 75a, thus sealing off the vacuum control chamber 28a from the exhaust pump connection 68a, and concurrently opening communication between this chamber and the segregation chamber D; thereby depressing the bell and initiating the accumulation of a fresh charge of glass therein.

In the construction last described the final level of the molten material in the segregation chamber is below the level of glass in the forehearth chamber and the algebraic value of $h$ in Equations (3), (4), (5) and (6) supra is therefore negative. If, as shown in Fig. 7, this value is approximately 2.3″, the relation between $V_1$ and $V_2$, under the conditions previously assumed, becomes (for $P_1 = P_0$)

$$\frac{V_1}{V_2} = \frac{14.4 + 0.23}{13.23 - 0.02} = \frac{14.63}{13.21} \cong 1.11$$

which shows that the adjusted volume $V_2$ of the vacuum control chamber 28a, should be somewhat smaller than it is when the final level of the glass in the bell is above that of the outside pool. If the bell chamber is not opened to the atmosphere prior to its being connected to the vacuum control chamber, and the value of $P_1$ is approximately 2 lbs. then from Equation (6)— (for $h = -2.25$ inches) we find $$\frac{V_1}{V_2} = \frac{14.63}{15.21} \cong 0.96+$$

i. e., the adjusted volume of the control chamber 28a should be about 4% greater than that of the segregation chamber at the initiation of the vacuum application.

The use of the guard tube, 8a (or 8), which surrounds the vertically reciprocable bell B, prevents any direct escape of the gases of combustion from the forehearth chamber through the roof opening for the said bell; and therefore eliminates the detrimental effect of such escaping gases on the parts of the operating mechanism which are positioned above this opening. In order to further protect these parts from undue heating (by radiation etc.) I may provide one or more thin metal shields—(such as are shown at 142 in Fig. 1 and at 142a in Figs. 6 and 7)—of highly polished stainless steel, or other suitable material, which are secured either to the upper end of the guard tube 8 (Fig. 1), or, preferably, to the metal shaft support for the bell; and, in conjunction with these shields, I may also use a series of nozzles or tuyères 143, which are positioned along the front of the forehearth, and are adapted to deliver a sheet of low pressure cooling air from the pipe 144 to the space between the shields and the forehearth roof. The use of such shielding and cooling means is an advantage in permitting the entire superstructure—which carries the operating mechanism—to be reduced in height and thus rendered easily accessible from the operating floor; but it is, of course, possible to extend the side post supports, 15 or 15a and 16 or 16a, to any distance above the forehearth frame, and correspondingly increase the distance between the hot sub-structure and the working mechanism, without in any way interfering with the desired operation of the latter. The only effect of such an elevation of the working parts—and particularly of the vacuum control chamber 28 or 28a—is a slight retardation of the final establishment of hydrostatic equilibrium, because any cooling of the air which passes from the hot bell chamber into a cooler control chamber correspondingly reduces the mean pressure in the system, and thus permits the glass to be lifted to a somewhat higher level in the bell than it will be when the temperature remains constant.

The space in front of the guard tube 8a is preferably heated by the use of auxiliary burners 93a; and in conjunction therewith I have also provided for electrically heating the lower portion of the segregation chamber D by the use of two segmental ring sections 145—146 of high resistance material which are connected in parallel with two opposed low resistance terminals 147—147 that are supplied with current from the insulated bus bars 148—148. A similar arrangement of supplemental heating elements may, if desired, be employed in conjunction with the structural arrangement of parts shown in Figs. 1 and 2; but the optional use of these elements is of greater advantage in the operation of such an organization as is illustrated in Figs. 4 and 7, where the segregation chamber is of relatively large diameter and the level of glass therein is always substantially below that of the parent body of hot molten material.

It will be observed that the vertically movable bell members B may be readily removed from the forehearth by detaching the clamp or cap connections, (19 or 22a—24a) which secure them to the shaft members (18 or 18a), and removing the flow or floor blocks (6 or 6a); and that the cooperating "valve" blocks (4 or 4a) can also be withdrawn, from below, whenever it becomes necessary to replace these parts. In doing this it is, of course, necessary to temporarily shut off the flow of glass to that portion of the forehearth chamber in which these parts are located; and this is done by lowering the skimmer and damper blocks 150 until they touch the inclined portion 151 of the forehearth floor. These damper members are preferably inclined forwardly, and are engaged at their side edges either with suitable grooves, or with projecting ledges, in or on, the forehearth walls; so that the forward movement of the glass from the chamber C, under the lower edge of the said members automatically presses them against the front of the roof opening through which they are inserted, and seals this joint against any escape of the gases of combustion therethrough. The opposite face joint—between the rear side of the damper member and the roof opening—may then be effectively closed by removable blocks 152 of fire clay or asbestos cement.

The inclined blocks 150 are provided with openings 153 or 153a, which permit of a free and unrestricted movement of the hot gases of combustion through the entire length of the forehearth chamber, either from or into the main tank chamber; and in order to facilitate this free circulation, and to also maintain the desired ratio between the depth of glass in the heating chamber and the volume of the furnace space thereabove, the rear part of the forehearth is preferably made of considerably greater height (and may also be made of greater width) than the front portion, whether the bell and guard members (B—8—8a) are located.

These last described features, of the forehearth and of the inclined apertured damper construction, are ancillary elements of my present improvements; and cooperate with the guard tube (8 or 8a), with the intermittently rotating bell (B), and with the supplemental heating means (145—146—147—148)—when the latter are used—to prevent the hot gases of combustion from escaping from the forehearth, and to maintain uniformity of temperature, and homogeneity of physical condition, in the outflowing stream of glass, and in the mold charges formed therefrom.

Any suitable form of quick acting shear mechanism—which is conventionally indicated in Fig. 1 by the reciprocable shear blades J, J—may be employed to sever the pulsating stream of glass, as it issues from the delivery orifice F, into successive mold charges of the desired weight and shape; this severance being preferably effected at the time when the vacuum is first applied, by opening communication between the control chamber (28 or 28a) and the bill chamber D, and is acting to momentarily retard the rate of delivery, and to thereby produce a forced "necking" of the outflowing stream.

In Figs. 6, 9, 12 and 13 I have illustrated one particular form of shear mechanism, which I have designed for use in connection with my present improvements, and which is adapted to cut the stream without chilling the material at the plane of severance. This mechanism comprises a thin metal disc 155, which is constantly revolved at a high peripheral speed (e. g. 3000 to 4000 ft. per minute), by means of the train of shaft and gear elements 156—(157—157)—158—(159—159) and 160; the last of which is connected to, and driven from a suitable motor (M), by a flexible (double universal joint) coupling member 161. The disc mandrel 156, the mitre gears 157—157, and the intermediate shaft 158, are all supported by an elongated piston member 163 which is reciprocably mounted in a cylinder 163, and is normally held in retracted position therein by the tension springs 165—165—165. The mitre gears 159—159 and the shaft 160 are supported in bearing members 166 and 167, that are carried by the rear head of the cylinder 163; and these elements of the driving train, are operatively coupled to the piston supported elements (156—157—158) by a keyway and spline connection between the shaft 158 and the gear 159 that slides thereon.

The cylinder 163—and the parts associated therewith—are all supported on an angle bracket 168, which is bolted against the metal floor plate of the forehearth extension 1a; and is also preferably secured (as by the bolts 170) to forwardly extending side bars 171—171, which form a guide for the head of the reciprocable piston 162, (and prevent the latter from turning in its cylinder support), and which are cross connected to form a head member, 172, that is adapted to carry a removable guard tube 173, which is positioned below, and in axial alignment with, the delivery orifice F. The member 172 is provided with an upwardly turned bracket extension 174, that may be bolted to the front wall of the forehearth framework (as shown in Fig. 6), and thus serve to assist in holding the associated cylinder piston and guard tube assembly (162—163—173 etc.) in proper relationship to the downwardly flowing glass stream; and it is also bored out to receive a second piston element 175, which is provided with a head 176 that is detachably secured to the piston 175, by the threaded piston rod 177. The rod 177 extends through the front wall of the piston chamber, and is engaged by a threaded sleeve 180, which serves to limit the inward movement of the piston members 176—176, (see Fig. 6), and which also serves to receive the thrust of the return spring 181, that normally holds the said members in their outer retracted position.

The head 176 is provided with a flared semi-cylindrical recess, which is shaped to conform to the contour of the adjacent portion of the outflowing stream of glass (at the moment when the said stream is contracted or "necked" by the termination of the super-atmospheric pressure action, and the immediate subsequent vacuum application as previously described) and which is itself provided with a narrow slot 183 that is preferably connected to the chamber in front of the piston 175, by the restricted ducts 184—184 (see Fig. 12). This chamber is connected to a suitable reservoir of high pressure fluid (compressed air, or preferably superheated steam) by the passageway 185 and the pipe connection 186; and the latter is also in communication, through the pipe 186a, with an outlet port and passage 187, that leads to the rear of the piston member 162. The passage 187 is also provided with an atmospheric vent port 188, which is controlled by a piston valve 190, that is actuated by a tappet valve rod 191; and which is opened and closed—at the ends of the forward and rearward movements of the piston member 162—by the respective engagement of the tappet arm 191a with the adjustable collar 192 on the shaft 158, and of the end of the tappet rod 191 with the head of the piston 162.

The pipe 186 is connected, by the vertical pipe 194, with a valve box 195 (see Fig. 9), which contains a piston valve 196 that is moved in one direction by the cam 197 on the shaft 78a, and in the opposite direction by a return spring 198. This valve chamber is connected to the fluid supply conduit 200, by the passage 201; and when the piston 196 is held in its outermost position (by the raised portion of the cam 197) the passage 201 is closed, the pipe connections 186—194 etc. are opened to the atmospheric exhaust port 202, and the pistons 162 and 175 of the shear mechanism are held in their retracted position by the springs 165 and 181. The shaft of the pinion gear 130—which drives the cam shaft 78a—is preferably operated from the same motor (M) as is used to rotate the shear disc 155 (e. g. by the sprocket chain or belt connections K, indicated in dotted lines in Fig. 12); but this is not essential, because the desired synchronism of feeding and severing successive mold charges is not, in this case, dependent upon the maintenance of any specific relationship between the rotative movements of the shear disc and of the timer cam shaft, but is determined by the relative settings of the three cams 75a, 77a and 197, on the latter shaft (78a), and by the cooperating adjustments of the super-atmospheric and sub-atmospheric control elements (45a—91a etc.)

The operation of the last described mechanism is as follows: The cam 197 is preferably set so that it acts concurrently with the cam 75a—in opening the passageway 201 and admitting pressure fluid to the shear cylinders at the instant that the valve 55a is lifted to apply vacuum to the glass in the segregation chamber D—and the pistons 175 and 162 are moved forward, so as to bring the slotted head 176 in juxtaposition to the "necked in" position of the stream, and to then pass the revolving disc 155 through this reduced and substantially stationary section of the molten glass. The slotted block 176 is not designed or intended to take any part in the actual severance of the stream, but only to act as a guard, which will prevent, to some extent, the radial projection of minute particles of melted glass from the edge of the rapidly revolving disc, and which may also be used to assist in encompassing the stream in a protective envelope of highly heated gas that is supplied from the slot and duct openings 183—184 etc.

Figs. 14, 15 and 16 illustrate (somewhat diagrammatically) an alternative form of "double disc" shear which may be used in place of the one shown in Figs. 6, 11, 12 and 13. This second exemplification of my revolving disc cutter comprises a pair of overlapping discs 155a—155b, which are symmetrically positioned on opposite sides of the vertical plane XI—XI (of Fig. 12); and which are adapted to be alternately moved, as a unit assemblage, from the full line position to the dotted line position of Fig. 14 to effect one severance and from the dotted line position back to the full line position, to effect the next severance. Each of these discs (155a and 155b) is clamped against the upper face of a bevel pinion 157a, which is rotatably mounted on a fixed stud pin 205, that is secured to the end of a cylindrical sleeve 206 (see Fig. 16); and these sleeves are slidably supported on shaft members 158a and 158b, which are mounted in fixed end bearings 207—207 and 208—208, and are driven, in opposite directions, by the train of bevel and spur gears 158a—209—210 and 211—211 that is shown at the right of Fig. 14. The shafts, 158a and 158b, carry bevel pinions 157b, which are slidably, but non-rotatably, engaged therewith by spline and keyway connections, and are held in proper mesh relationship with the pinions 157a by the bracket extension 212—212 of the sleeve members 206—206. These members (206) are cross connected at their inner (right hand) ends by a cross head 214, which is coupled, by the link 215, to a twin arm actuating lever 216, that is pivoted on a fixed support 217, and is flexibly connected, at an intermediate point in its length, to the movable piston rod head 218, of a double acting cylinder-piston assembly 219—220. The fixed cylinder member 219 may be conveniently supported on one of the side ports (e. g. 16a), of the forehearth frame; and is provided with two fluid supply connections 221 and 222 that lead to a suitable timer valve member, which is actuated by a cam on the shaft 78a, and which is adapted to alternately establish communication between a source of high pressure fluid and one of the cylinder connections, 221 or 222, and concurrently open the other connection (222 or 221) to the atmosphere.

The driving gears 209 and 210 are provided with suitable friction clutches (225 and 226) which may be concurrently actuated by means of a reciprocable frame 227, that is first moved in one direction, to engage the shaft with the gear 210 and disengage it from the gear 209, and then in the opposite direction, to effect the reverse connection. These alternately reversed movements are effected by a shift lever 228, which is fulcrumed, at 230, on a fixed support, and is engaged at its outer end, by two adjustable collars 231 and 232 that are carried by the piston rod extension 234. The direction of rotation of the motor shaft 160 is preferably such that when the parts are in the full line position of Fig. 14 the disc 155a is being revolved in a clockwise direction, and the disc 155b in a counter-clockwise direction.

The operation of this "double disc" shear will be readily understood from the preceding description. When the disc assembly is in the position last described, the severance of the stream of glass is effected by admitting compressed air (or other suitable fluid under pressure) to the left hand end of the cylinder 219 (through the connection 222) and the piston 220 is actuated to move the sliding frame 206—206—212—214 toward the end bearings 208; and the two oppositely revolving discs, 155a and 155b, are projected through the reduced neck portion of the accumulated mold charge 1, and carried on to the dotted line position to the right of the stream. The last half of this movement is progressively retarded (e. g. by a gradual cushioning of a portion of the trapped air at the exhaust end of the cylinder 219) so that the moving parts are brought to rest without shock or jar; and just before this movement is completed the collar 232 engages the shift lever 228 and reverses the clutch connections 226—225, etc., so that the discs 155a and 155b are then rotated in the opposite direction (as indicated by the dotted line arrows of Fig. 14). The next severance is effected by admitting fluid pressure to the right hand end of the cylinder 219 (through the pipe connection 221) and moving the parts back to the first described position; thereby bringing the collar 231 into engagement with the shift lever 228, and again reversing the direction of rotation of the cutting discs 155a and 155b.

In the use of this "double disc" shear the guard block 176 is dispensed with, but the lower guard tube 173a may be moved up until its upper end is in close juxtaposition to the plane of movement of the lower disc element 155b. The two cutting discs may be revolved in either direction with respect to the line of their joint transverse movement; but I prefer to operate them in the manner above described, so that the rotary motion of the edge of each disc is opposed to the linear motion of passage through the stream. Under these conditions of operation any lateral thrust of the two discs on the plastic material, as they move against it, is relieved by the reverse backward movement of the rotating edges with respect thereto, which tends to draw the glass toward the cutting edges instead of pushing it away from them.

I have referred, in the above description, to a "cutting" action of the revolving disc elements, but it will be understood that this action is quite different from that of an ordinary reciprocating shear blade, which severs the material by the relative approach movement of two sharpened edges that engage the soft material on opposite sides, and effect the severance of the stream, in part by a "pinching", and in part by a true shearing action. The rapidly revolving disc, or discs, act, on the contrary, like a "saw"; and the plain (unserrated) edges effect the desired severance of the glass in very much the same manner as similar smooth edge discs act to "cut" either hot or cold bars of metal; i. e., by the frictional generation of sufficient heat to actually melt away the metal in advance of the line of engagement. Such an operation exerts very little lateral pressure—and no pinching or squeezing action—on the material; and serves to heat, rather than to chill, the glass at the plane of severance, thus avoiding the "smear" and the "shear marks" which are frequently produced by the use of ordinary reciprocating shear blades.

Either the "single disc" or the "double disc" form of my improved severing mechanism is of particular advantage when the stream of glass is cut close to the lower end of the delivery orifice. This part of the stream is surrounded, for a considerable distance below its point of emergence, with a thin sheath or envelope S, of partially congealed and stiffened glass, which offers considerable resistance to the penetration of the ordinary cold shear blade, and correspondingly increases the difficulty of using such a form of severing element in this zone of action. But no such difficulty presents itself in the use of the high speed disc cutter; and the stiffened skin is, on the contrary, an advantage in such use, because it serves to resist and prevent any lateral displacement or distortion of the stream while the revolving disc is passing through it. I, therefore, preferably so adjust the vertical position of the severing mechanism, with respect to the bottom of the forehearth, that the plane of movement of the disc elements (155 or 155a and 155b) intersects, or lies within, this downwardly extending surface zone of stiffer and more viscous material. This adjustment of the "shear height" or plane of severance—which is effected by moving the cylinder assembly up or down on its forehearth frame supports (at 168, 174 etc.)—also enables me to utilize the "skin" effect, or surface tension effect of the cooler surface layer in temporarily, and controllably, restraining or arresting the stream movement of the glass, in the manner explained in my prior Patents Nos. 1,334,725 (line 68 et seq. pp. 2 and 3) and 1,375,336 (see lines 19 to 71 p. 3); and thereby assist the initial effect of the vacuum application in preventing any sensible downward flow of the molten material at the time of severance.

Thus it is apparent that during the operation of forming separate mold charges of molten glass I effect a severance of each successive charge by the localized application of mechanically generated heat to the issuing stream, and in this way, in effect, melt off the successive mold charges, or at least accomplish the severance under such conditions of localized heat application as to substantially, if not entirely, eliminate the possibility of scarring either the severed charge or the remaining stub. It will also be apparent that this may be accomplished without actually checking the stream flow by causing the severing disc or discs to move downwardly with the stream and at a rate sufficient to prevent a tendency of the glass to pile up on the disc or discs. In either case the discs are rotated at such a peripheral speed and are moved across the stream at such a rate as to substantially offset the tendency of the partially severed charge to pull away from the stub prior to complete severance and thus detrimentally affect the shape of the charge.

With the preceding disclosure as a guide those familiar with the construction and operation of glass feeders will be enabled to embody and utilize the characteristic features of my present improvements, in various other forms of apparatus that may differ in detail from the illustrative exemplifications which have been herein described; and it will, therefore, be understood that my invention, in its broader aspects, is not limited to the use of these specific exemplary embodiments; but that, within the scope of the accompanying claims, various changes may be made in the structural form, arrangement, and relationship of the operative parts without departing from the principles of the invention, and without sacrificing its chief advantages.

What I claim is:

1. A glass feeder comprising, a receptacle for molten glass having an orifice formed therein below the level of the glass contained therein, a bell projecting into the glass within said receptacle and above said orifice, a chamber, means for establishing a predetermined fluid pressure within said chamber, means for closing said chamber after such predetermined pressure is established therein, and means for establishing communication between said chamber and the interior of the bell while maintaining said chamber closed except for communication with said bell.

2. A glass feeder comprising, a receptacle for molten glass having an orifice formed in the bottom thereof, a bell projecting into the glass within said receptacle and above said orifice, a chamber, a source of fluid pressure, means for alternately connecting said chamber to said fluid pressure source and the interior of said bell to alternately establish a predetermined pressure within said chamber and to equalize the pressures in the chamber and the interior of the bell.

3. A glass feeder comprising, a receptacle for molten glass having an orifice formed therein below the level of the glass contained therein, a bell extending into the glass above said orifice, a chamber, means for evacuating said chamber, means for closing communication between said chamber and said evacuating means, and means for establishing communication between said chamber and the interior of said bell to equalize the fluid pressures in the chamber and the interior of said bell while said closing means continues to close off communication between said chamber and said evacuating means.

4. A glass feeder comprising, a receptacle for molten glass having an orifice formed therein below the normal level of the glass contained therein, a bell projecting into the glass within said receptacle and above said orifice, a chamber, means for adjusting the volumetric capacity of said chamber, means for establishing a predetermined fluid pressure within said chamber, means for closing said chamber after said predetermined pressure is established therein, and means for establishing communication between said chamber and the interior of said bell while maintaining said chamber closed except for communication with said bell.

5. A glass feeder comprising, a receptacle for molten glass having an orifice formed in the bottom thereof, a bell projecting into the glass above said orifice and movable toward and from said orifice, a chamber associated with said bell, means for evacuating said chamber, means for closing communication between said chamber and said evacuating means after said chamber has been evacuated, means for establishing communication between said chamber and the interior of said bell to draw glass from said receptacle into the interior of the bell and to move said bell toward said orifice while said closing means continues to close off communication between said chamber and said evacuating means.

6. A glass feeder comprising, a receptacle for molten glass having an orifice below the normal level of the glass contained therein, a bell projecting into the glass above said orifice and movable toward and from the orifice in response to variations in fluid pressure within said bell, means for delivering super-atmospheric pressure to the interior of the bell to move said bell away from said orifice and to expel glass through said orifice, and means for reducing the fluid pressure within said bell below atmospheric pressure to move said bell toward said orifice and to draw glass from said receptacle into said bell.

7. A feeder for molten glass, comprising a receptacle for molten glass having an orifice formed therein below the normal level of the glass contained therein, a bell projecting downwardly into the glass within said receptacle and located above said orifice and movable toward and away from said orifice in response to the introduction of sub and super-atmospheric pressures into the interior thereof, means for subjecting the interior of said bell to sub-atmospheric pressure, means for subjecting the interior of the bell to super-atmospheric pressure, and means for limiting the movements of said bell in response to such pressures.

8. A feeder for molten glass, comprising a receptacle for molten glass having an orifice formed in the bottom thereof, a bell aligned with, and projecting downwardly into the glass above said orifice, means for substantially counterbalancing the weight of said bell so that it is movable in response to variations of pressure introduced into the interior thereof, and means for alternately subjecting the interior of said bell to sub and super-atmospheric pressure.

9. A feeder for molten glass, comprising a receptacle for molten glass having an orifice in the bottom thereof, a bell projecting into the glass above said orifice and in alignment therewith, means for substantially counterbalancing said bell so that it is movable toward and away from said orifice in response to pressure variations within the interior thereof, and means for creating pressure variations within said bell to effect such movement thereof.

10. A feeder for molten glass, comprising a receptacle for molten glass having an orifice formed in a wall thereof, a bell aligned with said orifice and projecting downwardly into the glass above said orifice and movable toward and from the said orifice in response to variations of pressure within the interior thereof, means for subjecting the interior of the bell to subatmospheric pressure to move said bell toward said orifice and to accumulate glass from said receptacle within said bell, means for subjecting the interior of said bell to super-atmospheric pressure to move said bell away from said orifice and to expel glass therefrom, and means cooperating with said bell for substantially shutting off communication between the interior of said bell and the main body of glass within the receptacle when said bell moves in response to super-atmospheric pressure applied therein.

11. A feeder for molten glass, comprising a receptacle for molten glass having an orifice formed therein, a bell aligned with said orifice projecting into the glass within said receptacle and movable toward and away from said orifice, and means cooperating with said bell for substantially shutting off communication between the interior thereof and the main body of glass within said receptacle when said bell is moved away from said orifice.

12. A feeder for molten glass, comprising a receptacle for molten glass having an orifice formed in the bottom thereof, an upwardly projecting sleeve surrounding said orifice and terminating below the level of the glass within the receptacle and having a reentrant flange adjacent the top thereof, and a movable bell projecting downwardly into the confines of said sleeve and having a flared edge cooperating with said reentrant flange.

13. A method of forming separate mold charges of molten glass from a body of such glass, which consists in creating a flow from such body through a continuously open orifice submerged by the glass of such body, periodically accumulating glass from said body above said orifice by segregating a portion of the surface of said body and by placing such segregated portion of such surface in communication with a previously evacuated and otherwise sealed chamber, severing the flow from said orifice and then subjecting the accumulated glass above the orifice to an expelling force to augment the flow through said orifice.

14. A method of feeding molten glass through an orifice submerged by a body of such material, which consists in accumulating a mass of glass from said body and above said orifice by subjecting a portion of the glass of said body to subatmospheric fluid pressure and by progressively increasing such fluid pressure until a condition of hydro-dynamic equilibrium is obtained, and then subjecting the accumulated mass to an expelling force to force molten glass through said orifice.

15. A method of operating a feeder having a continuously open glass submerged flow orifice and a bell movable toward and away from said orifice for controlling the flow of glass through said orifice, which consists in substantially balancing said bell so that it is capable of moving in response to variations in pressure within the interior thereof, and then in alternately subjecting the interior of the bell to relatively high and relatively low fluid pressures to move said bell away from and then toward said orifice.

16. A method of operating a feeder having a continuously open, glass submerged, flow orifice and a bell movable toward and away from said orifice for controlling the flow of glass therethrough, which consists in substantially balancing said bell so that it is capable of moving in response to variations in pressure within the interior thereof, alternately subjecting the interior of the bell to relatively high and relatively low fluid pressures, and rotating the bell as it assumes a definite position in its movement in response to such variations in pressure.

17. A glass feeder comprising a receptacle for molten glass having a well located therein and provided with a continuously open orifice in the bottom thereof, a vertically movable bell aligned with said well, projecting downwardly through the glass contained in said receptacle and extending into said well, means carried in part by said bell and in part by the well enclosure for substantially shutting off communication between the interior of the well and the portion of said receptacle external thereto when said bell is in its uppermost position, means for controlling the movements of said bell toward and away from the orifice, and a glass severing mechanism located below said receptacle and adjacent to such orifice.

18. A glass feeder comprising a receptacle for molten glass having a well located therein and provided with a continuously open orifice in the bottom thereof, a bell aligned with said well, projecting downwardly through the glass contained in said receptacle and extending into said well and movable toward and away from said orifice, means carried in part by said bell and in part by the well enclosure for substantially shutting off communication between the interior of the well and the portion of said receptacle external thereto when said bell occupies its furthermost position from said orifice, means for controlling the movements of said bell toward and away from said orifice, means for rotating said bell as it approaches said orifice and a severing mechanism located below said receptacle and adjacent said orifice.

19. A glass feeder comprising a receptacle for molten glass having an apertured well in the bottom thereof, a reciprocable bell projecting downwardly into said well and having an outwardly flared lower end adapted to cooperate with an internally projecting shoulder on said well enclosure to restrict the opening of said well when said bell is in its uppermost position, means for substantially counterbalancing said bell, means for introducing a relatively low fluid pressure into said bell to accumulate a quantity of glass therein and to move said bell toward said orifice, means for introducing a relatively high fluid pressure into said bell to move said bell away from said orifice and bring the flared end thereof into cooperating engagement with said projecting shoulder and to expel molten glass from said well and through the apertured bottom thereof, and means operating in timed relation with the movements of said bell for severing the flow of glass issuing through the aperture of said well.

20. A glass feeder comprising a receptacle for molten glass having a submerged, open bottom well in the bottom thereof, a vertically reciprocable bell projecting downwardly into said well and having an outwardly projecting lower end adapted to cooperate with a reentrant flange formed on the well enclosure adjacent the upper end thereof to restrict the mouth of the well when said bell is in its raised position, means for substantially counter balancing said bell, means for introducing sub-atmospheric pressure into the interior of said bell to accumulate glass therein and to move said bell toward the open bottom of said well, means for introducing super-atmospheric pressure into the interior of the bell to expel glass therefrom and through the open bottom of said well and to move the lower end of the bell into cooperative relation with said reentrant flange, means for rotating said bell when in its lowermost position and means below said receptacle and adjacent the open bottom of said well for severing the flow of molten glass issuing from said well in timed relation with the movements of said bell.

FRANK L. O. WADSWORTH.